(12) United States Patent
Korpi

(10) Patent No.: US 6,935,214 B2
(45) Date of Patent: Aug. 30, 2005

(54) NOBACK BOLT

(75) Inventor: John G. Korpi, Livonia, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 78 days.

(21) Appl. No.: 10/392,485

(22) Filed: Mar. 19, 2003

(65) Prior Publication Data

US 2004/0182206 A1 Sep. 23, 2004

(51) Int. Cl.[7] .............................................. B25B 13/06
(52) U.S. Cl. ........................................ 81/121.1; 81/436
(58) Field of Search .............................. 81/121.1, 436, 81/442, 448, 451, 452, 461, 125, 121; 411/910, 911, 402, 403, 407, 399

(56) References Cited

U.S. PATENT DOCUMENTS

| | | | | |
|---|---|---|---|---|
| 817,090 A | * | 4/1906 | Pfeiffer | 36/67 C |
| 1,936,769 A | * | 11/1933 | Olivet | 16/381 |
| 2,459,610 A | * | 1/1949 | Zadina | 36/59 R |
| 3,423,855 A | * | 1/1969 | Kosono | 36/67 R |
| 5,120,168 A | * | 6/1992 | Padula | 411/5 |
| 5,410,823 A | * | 5/1995 | Iyoob | 36/127 |
| 5,451,124 A | * | 9/1995 | Meigs | 411/436 |
| 6,161,456 A | * | 12/2000 | Langford | 81/451 |

* cited by examiner

Primary Examiner—Derris H. Banks
Assistant Examiner—J Williams
(74) Attorney, Agent, or Firm—David L. Kuhn; Luis Miguel Acosta; Thomas W. Saur

(57) ABSTRACT

There is described and claimed herein a noback bolt design which comprises an elongated shaft having two opposing ends. The first end has an enlarged conical bolt head that extends from this shaft. On the opposite shaft end is a terminus or tip. Between the tip and the conical head, the shaft bears an externally threaded segment on at least a portion of the shaft. The precise length of this segment is determined upon intended applications of my bolt, and the type or exact number of structural components to be assembled. These components include panels, brackets, planar surfaces, chassises, and like structures.

7 Claims, 2 Drawing Sheets

NOBACK BOLT

GOVERNMENT INTEREST

The invention described herein may be made, used, and licensed by, or for, the United States Government for governmental purposes without paying any royalty.

BACKGROUND AND SUMMARY

The present invention generally relates to fasteners, such as a screw or bolt, which hold together one or more structural components in a strong, secured fashion. In another aspect, it also relates to non-removable or tamper-resistant fasteners. A special driving tool is also provided herein for the advancement of said fastener into said components.

Described herein is my noback bolt design comprising an elongated shaft having two opposing ends. The first end has an enlarged conical bolt head that extends from this shaft. On the opposite shaft end is a terminus or tip. Between the tip and the conical head, the shaft bears an externally threaded segment on at least a portion of the shaft. The precise length of this segment is determined upon intended applications of my bolt, and the type or exact number of structural components to be assembled. These components include panels, brackets, planar surfaces, chassises, and like structures.

The absence of a standard tool engaging surface on this conical head deters tampering or removal by traditional tools. Furthermore, this bolt is readily installed within one or more structural components to complete an assembly of constructs or workpieces with my aforementioned tool. However, once my noback bolt achieves a predetermined level of tightness, it is not readily removed without extraordinary efforts. Moreover, the noback bolt assures that a strong, mechanical bond or interlock is maintained in all assembled constructs or workpieces. Preferably, at least one of the components being joined together will have a compatible, internally threaded aperture or blind bore for acceptance of the threaded segment of my bolt. Also, at least one component must have a firm bearing surface upon which the underside of my bolt head will ultimately rest.

In the prior art, an ordinary bolt comprises an elongated, externally threaded shaft that longitudinally extends from a hex- or slot-shaped head. Such a bolt is usually positioned in a structural member by simply turning or rotating the head with a standard wrench or screwdriver in either a clockwise, or counterclockwise, direction depending on whether said bolt is being tightened or loosened, respectively.

In sharp contrast, my noback bolt is intended to turn in only a single direction (clockwise) and that is for the sole purpose of tightening said bolt against one or more structural components to make a completed assembly. Thus, for all practical purposes, an installed noback bolt is not removable and the joined constructs or workpieces are permanent. Examples of typical applications include plates of uparmor which can be added to legacy military vehicles to either modernize or upgrade their utility and missions. Similar applications exist within the appliance, automotive, aviation, and related industries of mass production, which prefer, or even mandate, nearly permanent or tamper resistant constructs for safety reasons.

DETAILED DESCRIPTION

Figure 1:
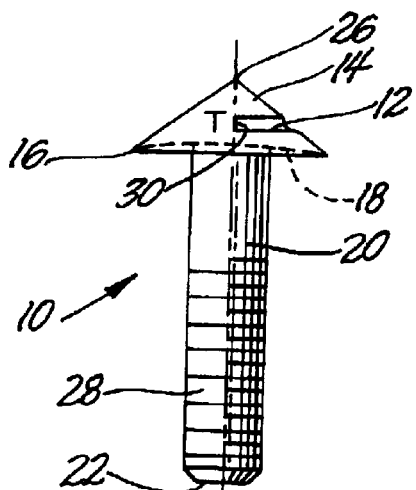
FIG. 1 is a front view of a first embodiment of my noback bolt.
Figure 2:
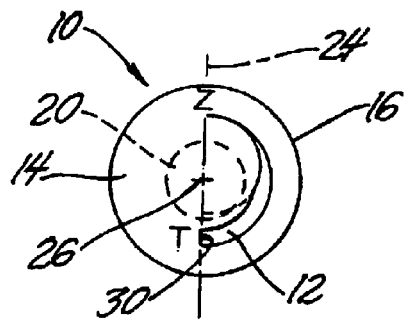
FIG. 2 is a top view of FIG. 1.

In the drawings, two equally satisfactory embodiments 10, 40 of my invention are depicted. FIG. 1 shows a first embodiment 10 of my noback bolt in side elevation with a single arcuate slot 12 contained within an enlarged, conical bolt head 16. Extending from the underside 18 of said head is an elongated shaft 20 that terminates at a tip 22 distal from the head. This shaft has a common central axis 24 with the apex 26 of the conical bolt head. At least a part of said elongated shaft 20 bears external threads 28 thereon. Depending on a specific application or need, the threads on this elongated shaft may extend for the full length of the shaft. Moreover, the shapes or sizes of the noback bolt may be of varying lengths and diameters. Further, while a coarse thread is depicted in FIG. 1; it could just as easily be a fine thread based upon the type of final assembly in which it is employed. FIG. 2 is a top view of the conical bolt 10 of FIG. 1 with a singular slot 12 embedded within the conical surface 14.

Figure 5:
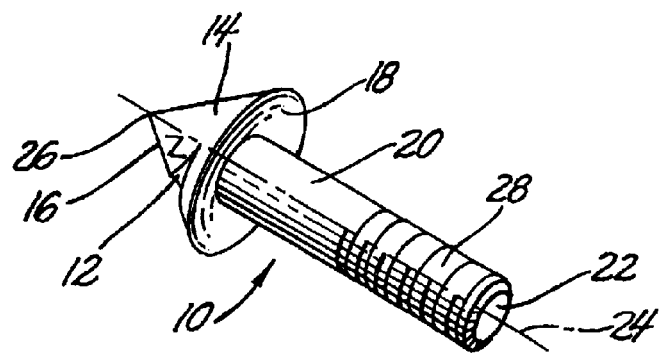
FIG. 5 is a perspective view of FIG. 1 showing the concave underside of the head of FIG. 1.

FIG. 5 is a view in perspective showing a scooped-out underside 18 of the conical bolt head 16 of FIG. 1 in greater detail. While not shown, my second embodiment 40 has a similar underside 48 in its bolt head 46. With specific reference to FIGS. 1, 3, and 5, the bolt heads 16 and 46 have a concave undersurface 18 or 48 that provides an extremely tight and secure joint between the bolt and the construct(s) or workpiece(s) whenever a bolt is tightly torqued into an assembled or installed position. The benefits of this design is further exemplified in my FIG. 6 wherein an assembly of two representative structural elements 32 (a panel having a threaded or unthreaded aperture) and 34 (a planar surface having a blind, internally threaded bore) are depicted using my noback bolt. When installed, the underside of my bolt head will preclude any attempt to loosen or remove it by either prying or lifting on said bolt head. In fact, this bolt will tightly abut, or even bite into, the surface of the top bearing surface of structural panel 32.

Figure 3:
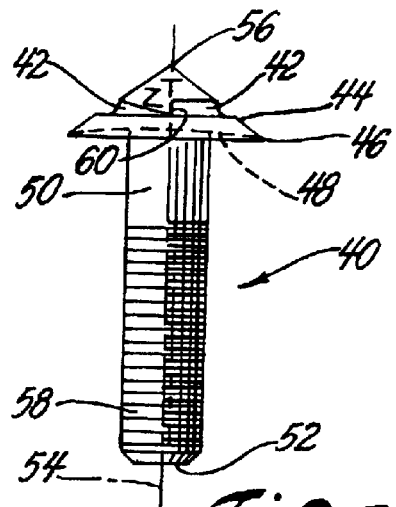
FIG. 3 is a front view of a second embodiment of my noback bolt.
Figure 4:
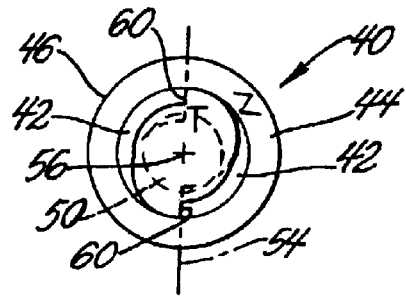
FIG. 4 is a top view of FIG. 3.

FIGS. 3 and 4 depict a double slotted embodiment 40 of my invention which is comprised of two, equally spaced apart arcuate slots 42. Each of my embodiments 10, 40 has a cone-shaped head 16, 46 that is designed to prevent gripping of the conical surfaces 14, 44 with ordinary tools, or by the use of traditional gripper tools like a pipe wrench or pliers. Further, these heads may be treated by any of the conventional processes known to the art which will additionally enhance and/or harden these surfaces to preclude the potential for scratching, marring, and/or gripping of these bolt heads 16, 46.

Figure 7:
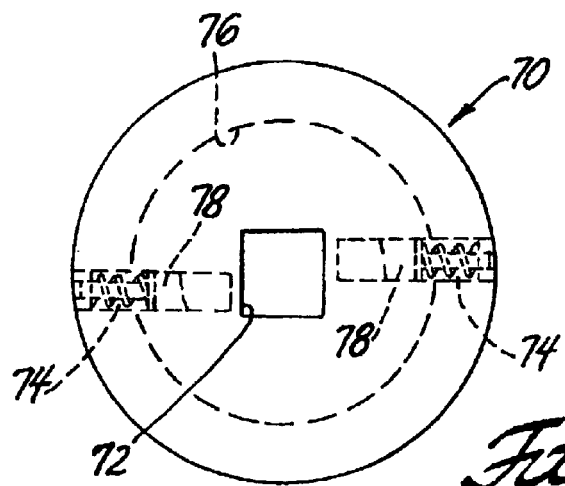
FIG. 7 is a top view of my special driving tool.
Figure 6:
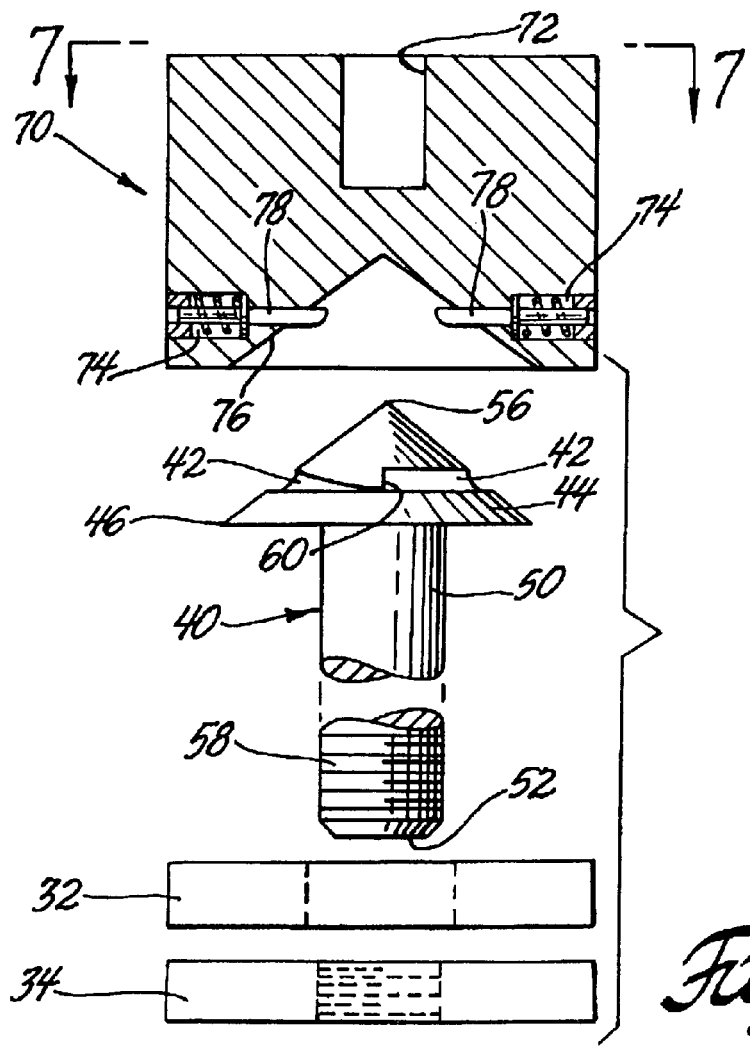
FIG. 6 is an exploded front view in partial section, of my special tool engaging the noback bolt of FIG. 3.

The sole means for tightening my noback bolt is generally shown in FIGS. 6 and 7 which are depictions of my driving tool 70. This tool appears therein as a standard, socket-like device that can be manufactured by conventional methods, such as machining, stamping, or casting. This tool is readily used with an ordinary socket wrench, ratchet, or driver which has a dimensionally compatible square-drive that fits within a first drive means 72 on top of my tool 70. This tool can also be further modified with the permanent, or detachable, addition of a "T" or "L" shaped handle. In these latter configurations, the modified tool will resemble a spark-plug wrench or a tire iron, respectively.

Generally, my tool 70 has an internal conical cavity 76 that begins as a central bore a short distance at its bottom, and then extends to a point remote from the top and near the first drive means 72. This cavity 76 is dimensionally sized and shaped to receive, and then conform with, the exterior conical surface of bolt head(s) 16, 46. Upon initial contact with a bolt head, the tool's second drive means 78 will engage the exterior conical surface(s) 14, 44 of said bolt, and then move directly away from the apex(es) 26, 56. After the tool's second drive means 78 engage the arcuate slot(s) 12, 42 within the heads of my noback bolts, said heads are easily advanced into the structural components 32, 34 to form a completed installation or assembly. Thereby, a mating engagement of the driving tool 70 with the slots 12, 42 and conical bolt heads 16, 46 will allow the manual application of sufficient forces to controllably position, install, and advance the bolt to perform work (rotation of said bolts) in a tightening direction.

In a preferred embodiment, my tool's second drive means 78 comprises two projections within the conical cavity 76 of my tool 70, which are interiorty positioned within bore(s) 74, equally spaced-apart, and spring-loaded or spring-biased. These spring-actuated projections are preferably selected from inserts, posts, pins, or detents that will readily deploy into arcuate slot(s) 12, 42 of the conical bolt head(s) 16, 46 when my tool 70 is placed over said bolts and rotated. As this version of my tool slides over the conical bolt head, the detents or posts will be initially forced back by the smooth, conical surface of the bolt head. As the tool 70 is then turned in the tightening direction at its fully seated depth on said bolt, these projections will fully engage the arcuate slot(s) of the bolt head and will rotate to a maximum slot depth until the land(s) or shoulder(s) 30, 60 are contacted. Thusly positioned, the subsequent rotating of this tool 70 will result in a desired degree of tightening of the bolt head to the surfaces of the workpiece(s) to be joined together by my noback bolt. Because the slots 12, 42, in the bolt heads 16, 46, are offset from the cone apexes 26, 56, and from the common axis(es) 24, 54 of both the conical head and the bolt shaft, the projections 78 of my preferred tool must be spring-actuated to accomplish their desired function. Those skilled in the art are familiar with acceptable substitutes and equivalents.

Referring back to FIG. 2 or 4, an arcuate slot 12 or 42 is essentially a semicircular element in design. It is generally offset from the apex 26 or 56, offset from the common axis 24 or 54 of the bolt head 16 or 46, and offset from the bolt shafts 20, 50, respectively, of my noback bolts. Moreover, the depth of these slots in my bolt(s) gradually increases from zero Z at the conical surface(s) 14 or 44 to a maximum depth at a point along the conical surface of about 180 degrees while traveling in a clockwise direction. At the termination T of the slot(s), and at their maximum width and depth, a land or shoulder 30 or 60 is provided therein for interfacing with both my special tool 70 and preferred drive means 78 for driving the conical bolt head. The internal surface(s) of the arcuate slots 12, 42 are also curved to provide a smooth and gradual transition from the exterior, conical surface(s) 14, 44 at the point Z of my noback bolt head to a maximum width and depth T at the land(s) 30 or 60. This unique feature of the slots also precludes the application and use of my driving tool 70 in the reverse (loosening) direction.

I wish it understood that I do not desire to be limited to the exact details of construction or method shown herein since obvious modifications will occur to those skilled in the relevant arts without departing from the spirit and scope of the following claims.

What is claimed is:

1. A noback bolt of unitary structural design comprising:
   a. an enlarged truncated conical head having an apex and a concave underside;
   b. an elongated shaft carrying external threads on at least a portion thereof extending from the concave underside of said head;
   c. a tapered tip opposite of said head and at the end of said shaft;
   d. a common central axis longitudinally extending from said head to said tip; and
   e. a receiving and engaging means embedded within said head for conformably accepting a driving tool having a compatible annular profile for said bolt head with a drive means positioned therein for inserting and advancing said bolt into a workpiece when a driving force is essentially applied to the bolt head along said common central axis, said receiving and engaging means comprising at least one arcuate slot embedded within the surface of said head, said slot being off-center from the common central axis of said shaft, and off-center from said apex and said concave underside of said conical head, said slot beginning at the conical surface and progressively increasing in depth along an arcuate, rounded bottom for about 180 degrees and ending in a stop adapted to be engaged by said driving tool, said slot being capable of conformably receiving and engaging said driving means of the driving tool when said tool is turned.

2. The noback bolt of claim 1 having two arcuate slots embedded within said head, each slot extending for about 180 degrees.

3. A driving tool comprising a cylindrical housing having top and bore ends, a centered, first drive means positioned within the top of said tool, and a second drive means positioned within a central internal bore formed within said bore end, said internal bore of said tool having a gradually tapered inward profile to therein form a conical cavity that is complimentary with the conical bolt head surface said second drive means comprising at least two spring loaded projections positioned within said gradually tapered profile, said projections offset from said top and said bore end, and also offset from a longitudinal central axis extending through said tool, said projections capable of engaging the arcuate slots of a noback bolt for inserting and driving said bolt into one or more workpieces with said tool by application of a rotating force along the longitudinal central axis of said tool.

4. The tool of claim 3 wherein said spring loaded projections are selected form the group consisting of pins, posts, detents, and inserts.

5. The tool of claim 3 wherein said projections are circumferentially spaced apart.

6. The tool of claim 3 wherein the first driving means is a dimensionally sized and shaped aperture that receives a common socket wrench or ratchet.

7. The tool of claim 6 which turns in only one direction.

* * * * *